L. REPP.
Cultivator.
No. 62,971.  Patented Mar. 19, 1867.
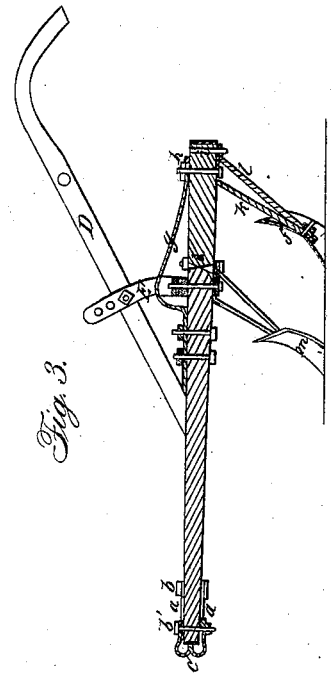
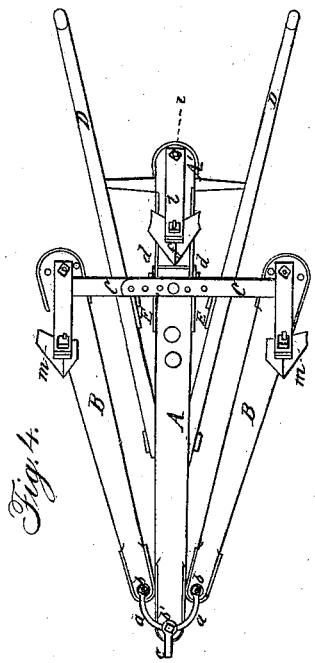
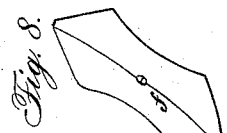
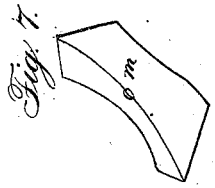
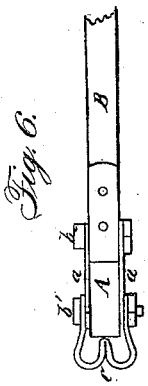
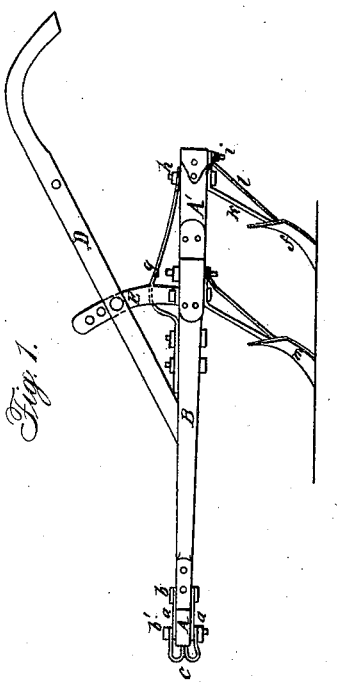
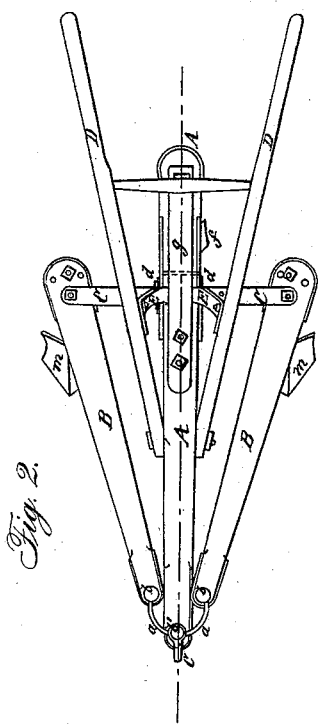
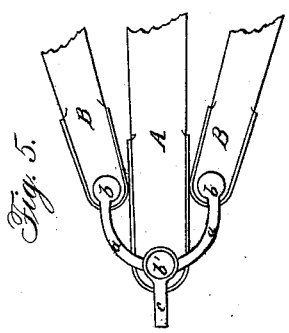
Witnesses:  Inventor:

United States Patent Office.

LEVI REPP, OF TIFFIN, OHIO.

Letters Patent No. 62,971, dated March 19, 1867.

---

IMPROVEMENT IN CULTIVATORS.

---

The Schedule referred to in these Letters Patent and making part of the same.

---

TO ALL WHOM IT MAY CONCERN:

Be it known that I, LEVI REPP, of Tiffin, Seneca county, State of Ohio, have invented certain new and useful improvements in Cultivators; and I do hereby declare that the following is a full, clear, and exact description thereof, reference being had to the accompanying drawings, making a part of this specification, in which—

Figure 1 is an elevation of one side of the new cultivator.
Figure 2 is a top view of the cultivator.
Figure 3 is a longitudinal section, taken in a vertical plane through the same.
Figure 4 is a bottom view.
Figure 5 is an enlarged view, showing the mode of attaching the front ends of the beams to a clevis.
Figure 6 is a side view of fig. 5.
Figures 7 and 8 show the form of the shovels or teeth.
Similar letters of reference indicate corresponding parts in the several figures.

This invention relates to certain novel improvements on that class of cultivators which have three beams, with a shovel attached near the rear end of each beam, and which are provided with lateral braces that admit of the lateral adjustment of the beams, to adapt the ploughs for working between rows of different widths. The object of my invention is to improve such a form of cultivator by attaching the central shovel-standard to a rear-jointed extension of the intermediate beam, which extension is held in place by a strong spring, in such manner that the shovel will adjust itself to the movements of the horse in passing over rough or uneven ground, at the same time the shovel will be allowed to spring back and pass over any obstruction which would be liable to break or derange the parts, as will be hereinafter described. Another object of my invention is to connect the front ends of the cultivator beams to a clevis plate, which is so constructed as to afford independent pivot connections for each one of the three beams, and to admit of the lateral extension or contraction of the outer beams, as will be hereinafter described. Another object of my invention is to employ reversible shovels which are constructed of such form that they are adapted for throwing the earth from young plants, and also for throwing the earth about the roots of the plants when they become older and require it, as will be hereinafter described.

To enable others skilled in the art to understand my invention, I will describe its construction and operation.

In the accompanying drawings, A represents the central beam, and B B represent two side beams, which are attached at their front ends to U-shaped clevis-plates $a\ a$ by means of pivot bolts $b\ b$. The clevis-plates $a\ a$, one on top and the other on the bottom of the beams, are pivoted centrally to the front end of the central beam A, by a pivot bolt, $b'$, which also forms a pivot connection for the clevis $c$, as shown in the drawings. The rear ends of the beams B B are connected to the rear end of the central beam A, in front of the joint $d$ of an extension A', by means of transverse braces C C, placed above and below said beams, and made so as to overlap each other upon the central beam. A bolt, $e$, is passed through holes which are made through said braces, and the central beam, which prevents the side beams B B from spreading apart or contracting. Several holes are made through the transverse braces C C, at suitable distances apart to admit of securing the rear ends of the beams B B at any required distance from the central beam. The same bolt $e$, which secures the braces C C to the central beam, also serves to secure the standards E to this beam, which standards are bolted to the stilts or handles D D, and support and brace them in rear of their front connection with said beam. The rear extension A' of the central beam A, is connected to this beam by means of side plates and a transverse bolt, which form the joint $d$, above mentioned, and allow the plate or shovel $f$ to rise when it meets with an obstruction, and pass over the same without injury. This extension A' is held down in place in line with its beam A by a strong spring, $g$, which is firmly bolted to the beam A, in front of the joint $d$, and extends backward, so that its rear end will press upon the extension A', as shown in the drawings. An oblong slot is made through that portion of the spring $g$ which bears upon the extension A', which slot receives through it the nut $h$, that confines the forward portion of the shovel standard in place, which nut, together with the spring $g$, affords a lateral support for the extension A'. The spring $g$ is bent in the form of an arch, where it passes across the braces C C, for the purpose of allowing access to the bolt $e$, for removing the same when desired. The shovel $f$ is secured by a bolt to the lower end of a standard, $k$, which is strengthened by a rear brace, $l$. The upper portion of the standard is bent, as shown in figs. 1 and 3, and secured to the extension A′ by the bolt and nut $h$; and in rear of this connection, the brace $l$ and standard $k$ are again secured to the extension by means of a vertical bolt, $i$, which passes down through A′, and has a nut on its lower end. On each side of the bolt $i$, as shown in figs. 2 and 4, a hole is made through A′ for allowing of the adjustment of the shovel $f$, to one side or the other of the position indicated in the drawings, for throwing the earth toward or from the rows of plants, as may be required. The standard and its brace are both made of strips of metal, bent in the proper manner, and stiffened by making them concavo-convex in cross-section. The shovels $m\ m$ of the side beams B B are secured to braced standards constructed like the standard and brace of the shovel $f$. The three shovels $m\ m$ and $f$ are reversible. The shovels $m\ m$ are of the form shown in figs. 4 and 7, with a narrow wing on one side of its vertical centre, and a wider wing on the opposite side thereof. When the narrow wings of said shovels are on the inner side, as shown in fig. 4, the machine is adapted for cultivating very young plants, such, for instance, as corn, and the narrow wings will run close to the plants without injuring them. The shovels are reversed, and the wider wings are presented inward, when the machine is adapted for cultivating large and strong plants.

Having described my invention, what I claim as new, and desire to secure by Letters Patent, is—

1. The construction of the central beam A of a three-beam cultivator, with a jointed extension, A′, having a shovel applied to it, and also a spring, $g$, for keeping it down and staying it laterally, substantially as described.

2. Pivoting the front ends of the three beams A B B to U-shaped clevis plates $a\ a$, substantially as described.

3. The construction of the shovels $m\ m$, with narrow and wide wings, and so that they can be reversed at pleasure, substantially as described.

4. In combination with the forward pivot connections of the three beams A B B, I claim the lateral extension braces C C, and stilt standards E, connected to beam A in front of the joint $d$, by a bolt, $e$, substantially as described.

LEVI REPP.

Witnesses:
H. NOBLE,
JAS. F. NOBLE.